United States Patent
Park et al.

(10) Patent No.: US 8,351,969 B2
(45) Date of Patent: Jan. 8, 2013

(54) METHOD AND SYSTEM FOR TRANSMITTING AND RECEIVING MEDIA ACCORDING TO IMPORTANCE OF MEDIA BURST

(75) Inventors: Sung-Jin Park, Suwon-si (KR); Sang-Kyung Sung, Seoul (KR); Ji-Hye Lee, Seoul (KR); Wuk Kim, Gwacheon-si (KR)

(73) Assignee: Samsung Electronics Co., Ltd (KR)

( * ) Notice: Subject to any disclaimer, the term of this patent is extended or adjusted under 35 U.S.C. 154(b) by 830 days.

(21) Appl. No.: 11/862,870

(22) Filed: Sep. 27, 2007

(65) Prior Publication Data
US 2008/0076361 A1 Mar. 27, 2008

(30) Foreign Application Priority Data

Sep. 27, 2006 (KR) .................. 10-2006-0094190

(51) Int. Cl.
*H04B 7/00* (2006.01)
(52) U.S. Cl. ..................... 455/518; 455/519
(58) Field of Classification Search .............. 455/518, 455/90.2, 519, 422.1, 512, 412.1
See application file for complete search history.

(56) References Cited

U.S. PATENT DOCUMENTS

| | | | |
|---|---|---|---|
| 2006/0025125 A1* | 2/2006 | Hong et al. ................ | 455/422.1 |
| 2006/0040694 A1* | 2/2006 | Yoon et al. ................ | 455/519 |
| 2006/0046758 A1* | 3/2006 | Emami-Nouri et al. ...... | 455/518 |
| 2006/0148504 A1* | 7/2006 | Kim ........................ | 455/518 |
| 2007/0155346 A1* | 7/2007 | Mijatovic et al. ........... | 455/90.2 |

FOREIGN PATENT DOCUMENTS

| KR | 1020050115686 | 12/2005 |
|---|---|---|
| KR | 1020050115708 | 12/2005 |
| WO | WO 2006/054857 | 5/2006 |

\* cited by examiner

*Primary Examiner* — Lana N Le
*Assistant Examiner* — Golam Sorowar
(74) *Attorney, Agent, or Firm* — The Farrell Law Firm, P.C.

(57) ABSTRACT

A method and system for transmitting and receiving media according to the importance of a media burst in a PTT over Cellular (PoC) system are provided. The method includes transmitting a Media Burst Control Protocol (MBCP) Request message containing importance indication information by a sending PoC client: a controlling PoC server receiving the MBCP Request message, and if the importance indication information is contained in the MBCP Request message, determining that an important message will be transmitted, creating an MBCP Taken message containing the importance indication information, and transmitting the MBCP Taken message to a receiving PoC client via a participating PoC server: and receiving, by the receiving PoC client, the MBCP Taken message, and if it is determined that the importance indication information is contained in the MBCP Taken message, informing that an important message will be transmitted.

18 Claims, 5 Drawing Sheets

| V=2 | P | 0 0 0 0 0 | PT=APP=204 | Length |
|---|---|---|---|---|
| SSRC of PoC Client requesting permission to send a Media burst ||||
| Name = PoC2 ||||
| Option ID || Option Length | | |
| Option Value ||||
| Option ID || Option Length | | |
| Option Value ||||

| V=2 | P | 0 0 0 0 0 | PT=APP=204 | Length |

| SSRC of PoC Client requesting permission to send a Media burst |

| Name = PoC2 |

| Option ID = x | Option Length=4 | |

| Formatted message – e.g., "IMPORTANT MESSAGE" MESSAGE DIRECTLY EDITED BY PoC CLIENT A |

FIG.5A

| V=2 | P | 0 0 0 0 0 | PT=APP=204 | Length |

| SSRC of PoC Server performing Controlling PoC Function |

| Name = PoC2 |

| Importance = xxx | Length=4 | |

| Formatted message – e.g., "IMPORTANT MESSAGE" MESSAGE DIRECTLY EDITED BY PoC CLIENT A |

FIG.5B

METHOD AND SYSTEM FOR TRANSMITTING AND RECEIVING MEDIA ACCORDING TO IMPORTANCE OF MEDIA BURST

PRIORITY

This application claims priority under 35 U.S.C. §119(a) to a Patent Application filed in the Korean Intellectual Property Office on Sep. 27, 2006 and assigned Serial No. 2006-94190, the contents of which are incorporated herein by reference.

BACKGROUND OF THE INVENTION

1. Field of the Invention

The present invention relates generally to a media transmission and reception method and system of a Push-to-Talk (PTT) over Cellular (PoC) system. In particular, the present invention relates to a method and system for transmitting and receiving media according to the importance of a media burst to be transmitted to a PoC user.

2. Description of the Related Art

The development of mobile communication and the spread of communication networks have contributed to various extra services and applications using cellular phones. At the same time, demand among cellular phone users for various extra services, such as a positioning service, a multimedia service, and a push-to-talk (PTT) service, is increasing. Among these extra services, the PTT service supports various supplementary functions such as an instant messenger function and a status display function, as well as supporting a group call and a voice call which are also provided by an existing radio or a Trunked Radio System (TRS).

Currently, standardization of a PTT-over-Cellular (PoC) service which employs the PTT function in a mobile communication network is actively being developed. One unique feature of the PoC service, which is distinguished from existing mobile communication services, is that a user can participate in a plurality of PoC sessions and can move among the PoC sessions to use a call service. A requirement that the user can move among the plurality of PoC sessions to use the call service is specified in the Open Mobile Alliance (OMA), which is a forum for specifying mobile communications services.

Figure 1:
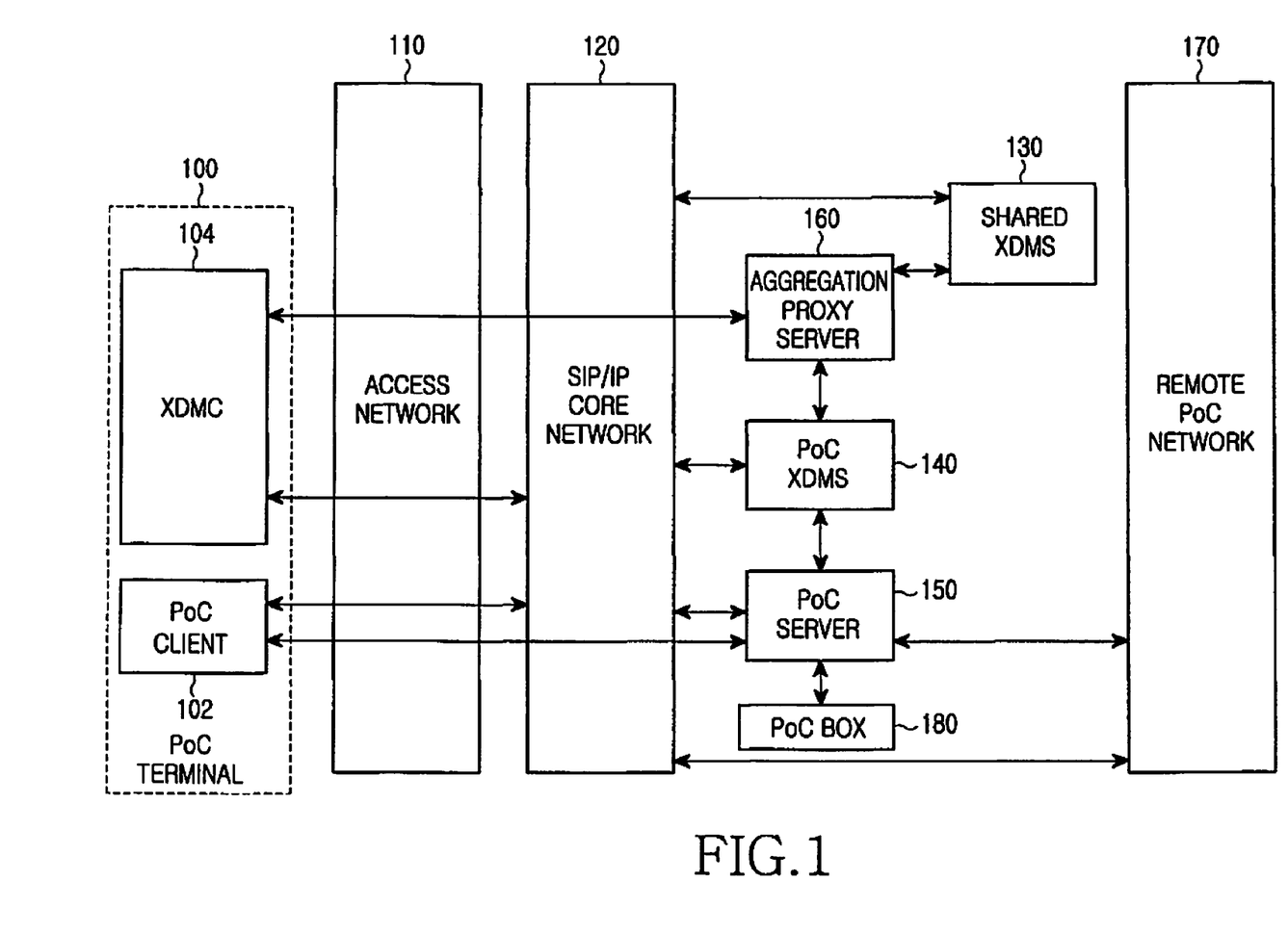
FIG. 1 is a schematic diagram of a conventional PoC service system.

FIG. 1 is a schematic diagram of a conventional PoC service system. Referring to FIG. 1, a PoC client 102, which is a service requester installed in a PoC user terminal 100, is connected to a Session Initiation Protocol/Internet Protocol (SIP/IP) core network 120, which supports SIP and IP multimedia functions, via an access network 110.

The PoC client 102 resides in the PoC user terminal 100 to provide access to the PoC service. The PoC client 102 mainly serves in the side of a PoC user to initiate a PoC session, participate in a PoC session that is currently proceeding, and terminate a PoC session. In addition, the PoC client 102 acts to make and transfer a talk burst, support an instant personal alert, and perform authentication when accessing the PoC service. Hereinafter, unless otherwise stated, the PoC client 102 is assumed to be the same as a PTT service subscriber.

The SIP/IP core network 120 is connected to a PoC server 150, a PoC Extensible Markup Language Document Management Server (XDMS) 140, and a PoC box 180, in order to support the PoC service.

The PoC server 150 has a controlling PoC function for maintaining and managing a PoC session, or a participating PoC function for participating in a PoC session established for a one-to-one PoC call or a one-to-many PoC call.

A function of the PoC server 150 is classified into a controlling PoC function (CF) for generally maintaining and managing a PoC session and a participating PoC function (PF) for maintaining and managing each PoC session, which will be described in more detail with reference to Tables 1 and 2.

TABLE 1

Controlling PoC Function (CF) provides centralized PoC session handling

Provides the centralized Media distribution
Provides the centralized Talk Burst Arbitration functionality including talker identification
Provides SIP session handling, such as SIP session origination, termination, etc.
Provides policy enforcement for participation in group sessions
Provides the participants information
Collects and provides centralized media quality information
Provides centralized changing report
May provide transcoding between different codecs
Support Talk Burst Control Protocol Negotiation As shown in Table 1, the CF serves to generally manage a PoC session among functions of the PoC server 150. The PoC server 150 receives requests for a floor (right-to-talk) from PoC clients, arranges an order in which to give the clients the floor, and gives the clients the floor in that order. The PoC server 150 also distributes a talk burst from a specific PoC client to all PoC clients participating in a group PoC call, and provides information of the PoC clients participating in the group PoC call.

As shown in Table 2 below, the PF manages a PoC session between the CF and each PoC client. In particular, the PF acts to relay the floor between the PoC client and the CF when the PoC client requests the floor or when the CF gives the floor to the PoC client. In addition, the PF serves to relay media between the CF and the PoC client, provide transcoding between different codecs, and provide a filtering function for filtering one of two PoC sessions chosen by a user when there is simultaneous talking in two simultaneous PoC sessions.

TABLE 2

Participating PoC Function (PF) provides PoC session handling

May provide the Media relay function between PoC Client and Controlling PoC server
May provide user media adaptation procedures
May provide the Talk Burst control message relay function between PoC Client and Controlling PoC server
Provides SIP session handling, such as SIP session origination, termination, etc., on behalf of the represented PoC Client
Provides policy enforcement for incoming PoC session (e.g. access control, incoming PoC session barring, availability status, etc.)
May collect and provide media quality information
Provides the participant charging reports
May provide filtering of the media streams in the case of simultaneous sessions
May provide transcoding between different codecs
May support Talk Burst Control Protocol Negotiation
Stores the current Answer Mode and Incoming PoC Session Barring preferences of the PoC Client An aggregation proxy server 160 acts to collect requests of all entities using an XML Configuration Access Protocol (XCAP) in the PoC service system and transfer the requests to corresponding entities.

In order to use a PoC call service, the PoC user registers his/her PoC address in the SIP/IP core network 120. The SIP/IP core network 120 stores information regarding the PoC user at the request of the PoC user. Thus, when another PoC user tries to request a group PoC call, the PoC user registers his/her information in the SIP/IP core network 120 in advance, as described above, and requests the group PoC call to his/her SIP/IP core network 120 by using group identification information transmitted from the PoC XDMS 140. The SIP/IP core network 120 performs address determination and domain location determination using information on the call requesting PoC user, and then transfers a PoC call request to a home PoC server with which the call requesting PoC user is registered. In regard to the PoC call request, the PoC server 150 prepares for establishment of a PoC session, obtains each user's information from the PoC XDMS 140, and then transfers a PoC call request signal to a corresponding SIP/IP core network 120. Here, in the case of a PoC call request to users within an Intradomain, the PoC server 150 performs both the CF and PF functions. The PoC server 150, which manages a call-requested PoC user, requests a PoC call to the PoC user after the SIP/IP core network 120 performs the location determination procedure, by using information on the PoC user that is transmitted to the PoC server 150. If the call-requested PoC user transmits an OK response to the call requesting PoC user, a PoC call is connected. When a PoC call is not connected due to the state of another PoC user regardless of a PoC call request of a PoC user, the PoC user can store his or her voice or media desired to transmit, using the PoC box 180.

As described above, the PF can manage simultaneous PoC sessions. In the simultaneous PoC sessions, a PoC client cannot simultaneously receive media transmitted from a plurality of sessions. That is, only media related to a single session can be transmitted to a PoC user for a transport time. In general, a PoC server keeps a first-in first-out basis regardless of media transmitted from any session. The PoC server removes other media received while media is being transferred. In this case, the PF may filter media which the PoC user must receive. In order to prevent this case, a media receiving PoC user can set a primary or locking-in session. In the case of a primary or locking-in session, even if other media is being transferred, media related to the primary or locking-in session is transferred first of all.

Figure 2:
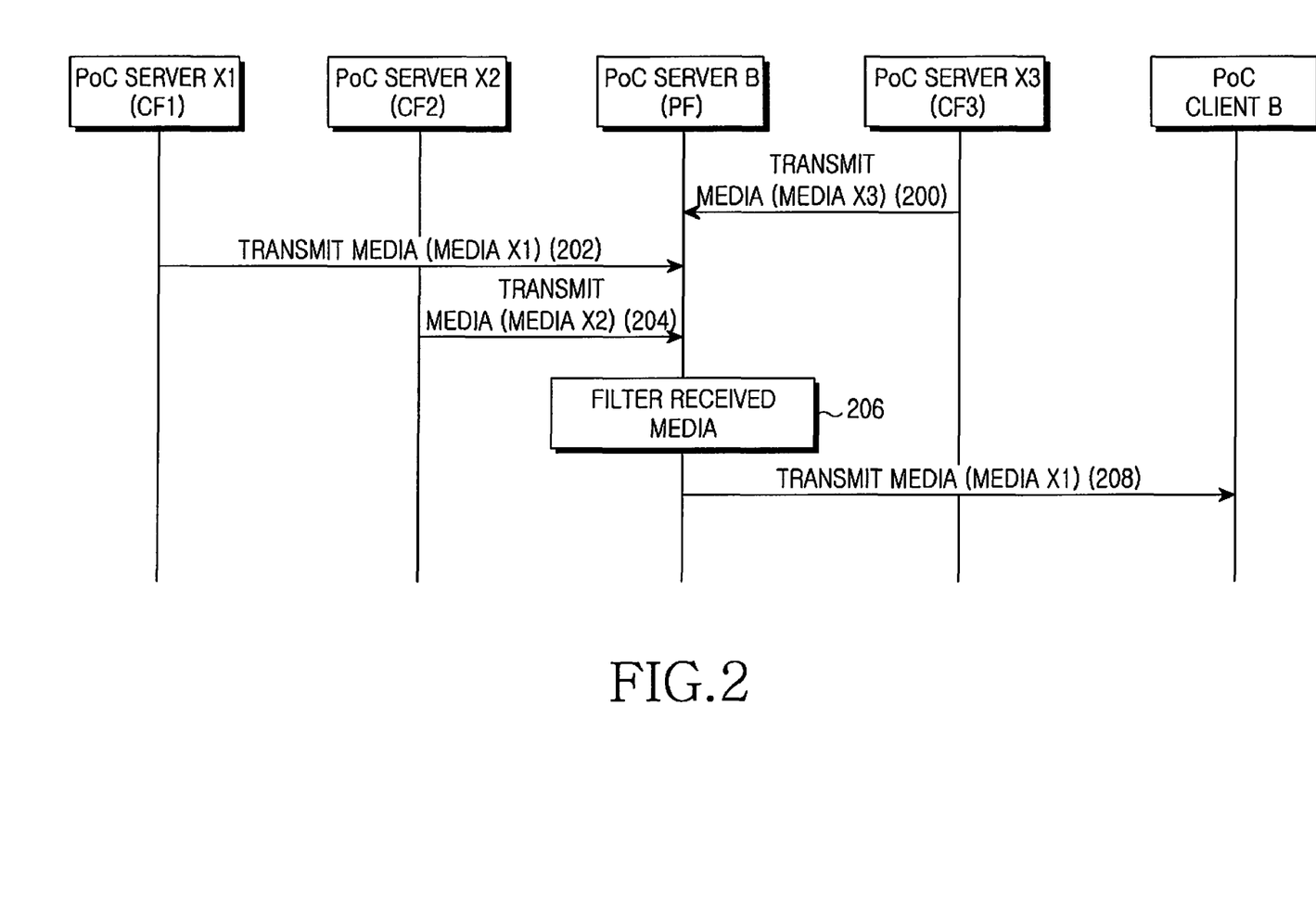
FIG. 2 is a signaling diagram of a process of transmitting and receiving media in conventional simultaneous PoC sessions.

FIG. 2 is a signaling diagram of a process of transmitting and receiving media in conventional simultaneous PoC sessions. In FIG. 2, it is assumed that a PoC client B has set a PoC session controlled by a PoC server X1 as a primary or locking-in session in a PF in advance.

The PoC client B has three PoC sessions connected to each other by means of a Participating PoC server B (PF). Servers controlling each PoC session are the PoC server X1 (CF1), a PoC server X2 (CF2), and a PoC server X3 (CF3). Each PoC server transmits media to the Participating PoC server B (PF).

It is assumed that the PoC server X3 (CF3) transmits media in step 200, the PoC server X1 (CF1) transmits media in step 202, and the PoC server X2 (CF2) transmits media in step 204. In a general case, i.e. in the case where all the PoC sessions have the same priority, the first transmitted media X3 must be transmitted to the PoC client B. However, since the PoC session controlled by the PoC server X1 (CF1) is set as the primary or locking-in session by a PoC user, the media of the PoC session controlled by the PoC server X1 (CF1) is filtered in step 206. Even though the media X1 has been transmitted to the Participating PoC server B (PF) after the media X3, the Participating PoC server (PF) transmits the media X1 to the PoC user (PoC client B) in step 208, according to the filtering operation of step 206.

In general, in order for a PoC user to transmit a media burst, a message for requesting a media transmission right (Media Burst Control Protocol (MBCP) Request message), a message for informing PoC users participating in a PoC session of who transmits media (MBCP Taken message), and a message for permitting media transmission (MBCP Granted message) are necessary. If a PoC client transmits an MBCP Request message to a PoC server, the PoC server determines whether media transmission is limited, and transmits an MBCP Granted message to the PoC client. Only the PoC user who has received the MBCP Granted message can talk.

Figure 3:
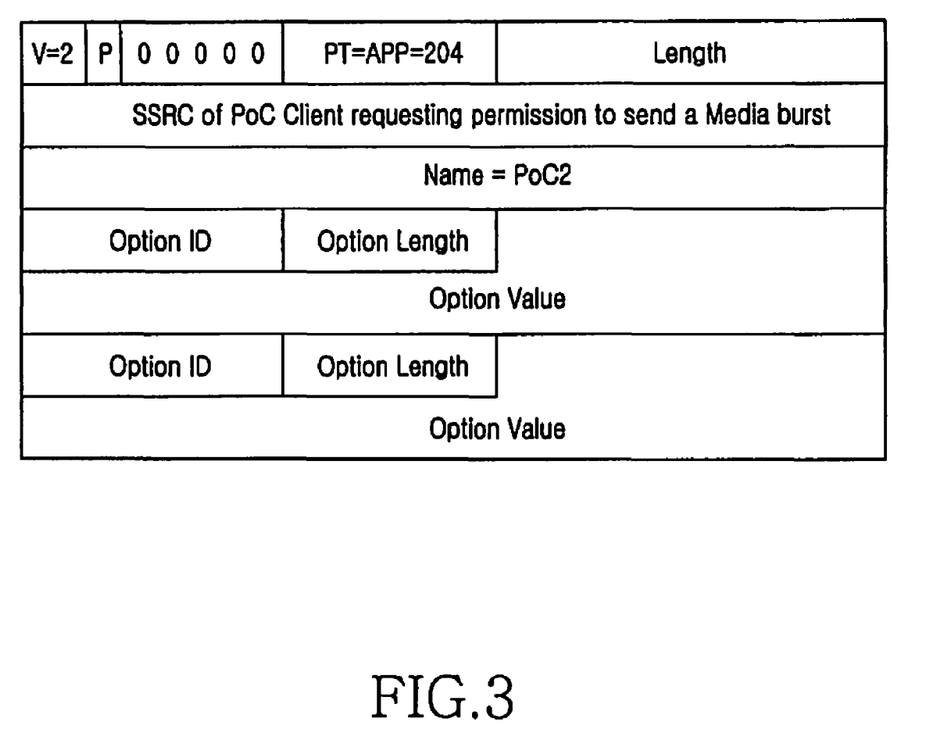
FIG. 3 is a message format of a conventional MBCP Request message.

The MBCP Request message has a message format illustrated in FIG. 3.

Referring to FIG. 3, the first 2-bit field is for a Real-time Transport Protocol (RTP) version. In the case of the present invention, the RTP version is 2. The second 1-bit field is for a padding bit. It can be seen that, if the padding bit is given, one or two padding octets that are not contained in a payload are added. The third 5-bit field indicates a subtype. It can be seen by referring, to an OMA PoC User Plane specification, which function of a Time Burst Control Protocol (TBCP) a Real-time Transport Control Protocol Application (RTCP APP) packet performs using the subtype. For example, in the specification that is currently drafted in the OMA, the subtype has values defined as 00000 for a TBCP Talk Burst Request message, and as 00001 for a TBCP Talk Burst Granted message. Since 16 TBCP Talk Burst Control messages are defined as of now, the subtype values are defined up to 01111. The remaining 16 values are reserved for the TBCP Talk Burst Control messages to be newly created in the future. The fourth 1-byte field is for a Packet Type (PT), and is shown as PT=204, which indicates that this message is an RTCP APP packet. The fifth 2-byte field is for a length field. If a value of 2 is used in the length field, this indicates that the message has two 4-byte octets. If the value is followed by a payload, this indicates a length of the payload, i.e. how many 4-byte octets exist in the payload. The sixth 4-byte field is a Synchronization SouRCe (SSRC) field. This field contains a synchronization source to discriminate who sent the RTCP APP message. The seventh 4-byte field is expressed by American Standard Code for Information Interchange (ASCII), which has the function of discriminating a PoC version according to the OMA PoC specification.

The eighth 1-byte option ID field indicates the priority if a value of the option ID is 1 or an MBCP Request transport time stamp if the value of the option ID is 2, when a PoC user transmits media.

As described above, in the conventional simultaneous PoC sessions, a PoC client cannot simultaneously receive media transmitted from a plurality of sessions. Only media related to a single session can be transmitted to a PoC user for a transport time. In general, first input media is output first regardless of media transmitted from any session. Other media received while media is being transferred is removed. In this case, the Participating PoC server (PF) may filter media which the PoC user must receive. In order to prevent this case, a media receiving PoC user can set a primary or locking-in session. In the case of a primary or locking-in session, even if other media is being transferred, media related to the primary or locking-in session is transferred first of all.

As described above, according to the request of a media receiving PoC user, it can be set so that media transferred from a specific session can be received without filtering in a PoC server. That is, in the conventional simultaneous PoC sessions, while media transmission can be determined by a selection of a media receiving PoC user, there is no method used by a media sending PoC user to set to transfer media corresponding to an important message without filtering. Thus, when the media sending PoC user transmits media containing an important message, the message may not be transferred. Accordingly, when a PoC user transmits important media, it is necessary to inform a target PoC user of the importance of the media to be transmitted, and a method of surely transmitting the important media without filtering is required.

SUMMARY OF THE INVENTION

An aspect of the present invention is to substantially solve at least the above problems and/or disadvantages and to provide at least the advantages below. Accordingly, an aspect of the present invention is to provide a media transmission and reception method and system for informing a target PTT over Cellular (PoC) user of the importance of media to be transmitted when a PoC user wants to transmit important media.

Another aspect of the present invention is to provide a media transmission and reception method and system for surely transmitting important media to a target PoC user without filtering when a PoC user wants to transmit the important media.

According to one aspect of the present invention, there is provided a method of transmitting and receiving media according to the importance of a media burst in a PoC system which includes a sending PoC client trying to transmit media and a receiving PoC client participating in simultaneous PoC sessions, the method including the sending PoC client transmitting a Media Burst Control Protocol (MBCP) Request message containing importance indication information; a controlling PoC server receiving the MBCP Request message, and if the importance indication information is contained in the MBCP Request message, determining that an important message will be transmitted, creating an MBCP Taken message containing the importance indication information, and transmitting the MBCP Taken message to the receiving PoC client via a participating PoC server; and the receiving PoC client receiving the MBCP Taken message, and if it is determined that the importance indication information is contained in the MBCP Taken message, informing that an important message will be transmitted.

According to another aspect of the present invention, there is provided a system for transmitting and receiving media according to the importance of a media burst, the system including a sending PoC client for transmitting a Media Burst Control Protocol (MBCP) Request message containing importance indication information; a controlling PoC server for receiving the MBCP Request message, and if the importance indication information is contained in the MBCP Request message, determining that an important message will be transmitted, creating an MBCP Taken message containing the importance indication information, and transmitting the MBCP Taken message to a receiving PoC client via a participating PoC server; and the receiving PoC client for receiving the MBCP Taken message, and if it is determined that the importance indication information is contained in the MBCP Taken message, informing that an important message will be transmitted.

BRIEF DESCRIPTION OF THE DRAWINGS

The above and other objects, features and advantages of the present invention will become more apparent from the following detailed description when taken in conjunction with the accompanying drawing in which.

DETAILED DESCRIPTION OF THE PREFERRED EMBODIMENT

Preferred embodiments of the present invention will be described herein below with reference to the accompanying drawings. Hereinafter, there is described a case of applying the present invention to a Push To Talk (PTT) system, in particular, a PTT over Cellular (PoC) system providing a PTT service using a cellular mobile communication network. In general, the PoC system uses a Session Initiation Protocol (SIP) and a SIP extension protocol in order to transfer session participation information of a group PoC call, and an Extensible Markup Language Configuration Access Protocol (XCAP), in order to obtain group information. The functionality of the present invention described below can be implemented using the above-described protocols, and the basic construction of the present invention can be based on a PoC Re1.1 system.

The present invention provides a method employed by a PoC user trying to transmit media by informing that the media to be transmitted is important in order to prepare for a case where a target PoC user in simultaneous PoC sessions cannot receive the media transmitted by the PoC user. The present invention also provides a method of surely transmitting media transmitted by a PoC user to a target PoC user by preventing the media from being filtered by a participating PoC server (PF).

In order for a PoC user wanting to transmit media to indicate that his/her media is important, the PoC user may transmit a Media Burst Control Protocol (MBCP) Request message containing importance indication information to a PoC server. The PoC server, which has received the MBCP Request message containing the importance indication information for informing that an important message will be transmitted, informs a target PoC user that the PoC user currently trying to transmit media wants to transmit the important message by transmitting an MBCP Taken message containing the importance indication information to the target PoC user.

Figure 5A:
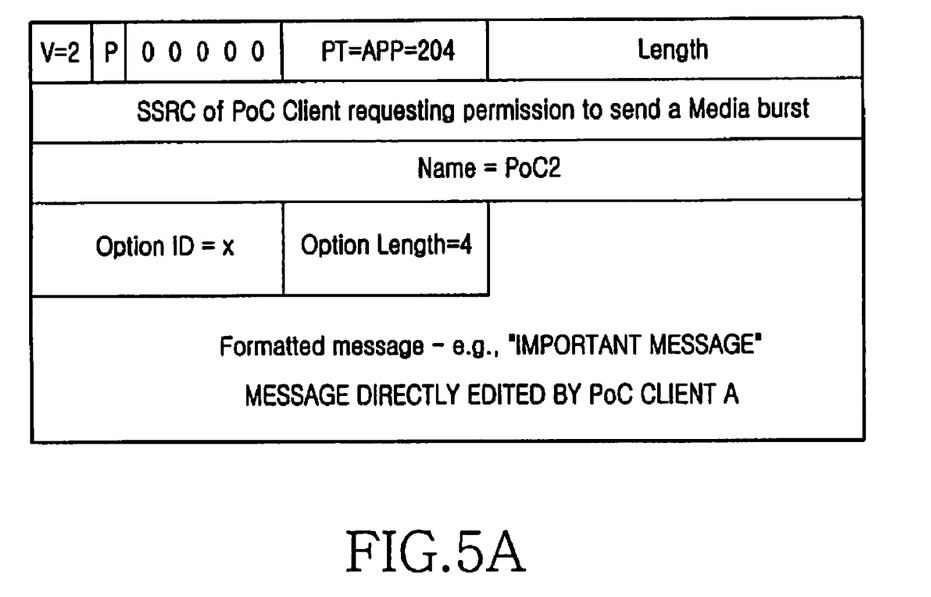
FIG. 5A is a message format of an MBCP Request message containing importance indication information according to an exemplary embodiment of the present invention.

FIG. 5A is a message format of an MBCP Request message containing importance indication information according to an exemplary embodiment of the present invention.

Referring to FIG. 5A, the first 2-bit field is for a Real-time Transport Protocol (RTP) version. In the case of the present invention, the RTP version is 2. The second 1-bit field is for a padding bit P. It can be seen that if the padding bit is given, one or two padding octets that are not contained in a payload are added. The third 5-bit field indicates a subtype. It can be seen by referring to an OMA PoC User Plane specification which function of a Time Burst Control Protocol (TBCP) a Real-time Transport Control Protocol Application (RTCP APP) packet performs using the subtype. For example, in the specification that is currently drafted in the OMA, the subtype has values defined as 00000 for a TBCP Talk Burst Request message, and as 00001 for a TBCP Talk Burst Granted message. Since 16 TBCP Talk Burst Control messages are defined as of now, the subtype values are defined up to 01111. The remaining 16 values are reserved for the TBCP Talk Burst Control messages to be newly created in the future. The fourth 1-byte field is for a Packet Type (PT), and is shown as PT=204, which indicates that this message is an RTCP APP packet. The fifth 2-byte field is for a length field. If a value of 2 is used in the length field, this indicates that the message has two 4-byte octets. If the value is followed by a payload, this indicates a length of the payload, i.e. how many 4-byte octets exist in the payload. The sixth 4-byte field is a Synchronization SouRCe (SSRC) field. This field contains a synchronization source to discriminate who sent the RTCP APP message. The seventh 4-byte field is expressed by American Standard Code for Information Interchange (ASCII), which has the function of discriminating a PoC version according to the OMA PoC specification.

In particular, in the current embodiment, importance indication information for informing that an important message will be transmitted as media is contained in option ID related fields, wherein a unique number for activating an importance indication function may be allocated in the option ID related fields. That is, a PoC client may activate the importance indication function by allocating a unique number to the eighth 1-byte option ID field of an MBCP Request message. In addition, the tenth option value field may contain normalized text, such as 'important message', or a phrase directly edited by a PoC user.

Figure 5B:
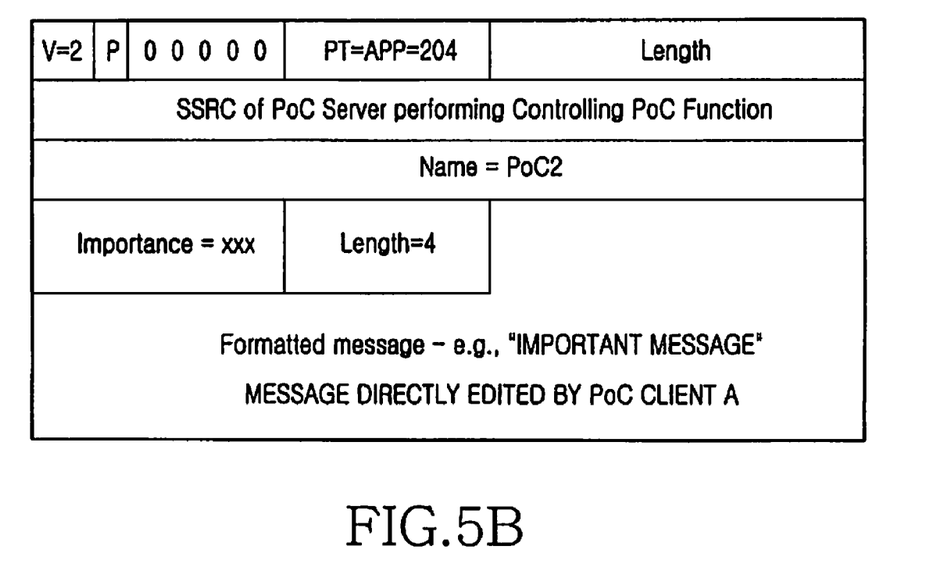
FIG. 5B is a message format of an MBCP Taken message containing importance indication information according to an exemplary embodiment of the present invention.

A participating PoC server (PF), which has received an MBCP Request message containing the importance indication information described above, determines based on a unique number of the option ID field that the MBCP Request message contains the importance indication information, creates an MBCP Taken message containing the importance indication information, and transmits the MBCP Taken message to a target PoC client. FIG. 5B is a message format of an MBCP Taken message containing importance indication information according to an exemplary embodiment of the present invention.

Referring to FIG. 5B, the MBCP Taken message has option related fields containing a unique number as well as the MBCP Request message illustrated in FIG. 5A. A PoC client can determine from the unique number whether the MBCP Taken message is a message containing the importance indication information. An option value field can contain the same phrase as contained in the MBCP Request message illustrated in FIG. 5A. The PoC client that has received the MBCP Taken message may inform a PoC user that a current message transmitting session tries to transmit an important message by displaying the phrase contained in the option value field on a screen.

Figure 4:
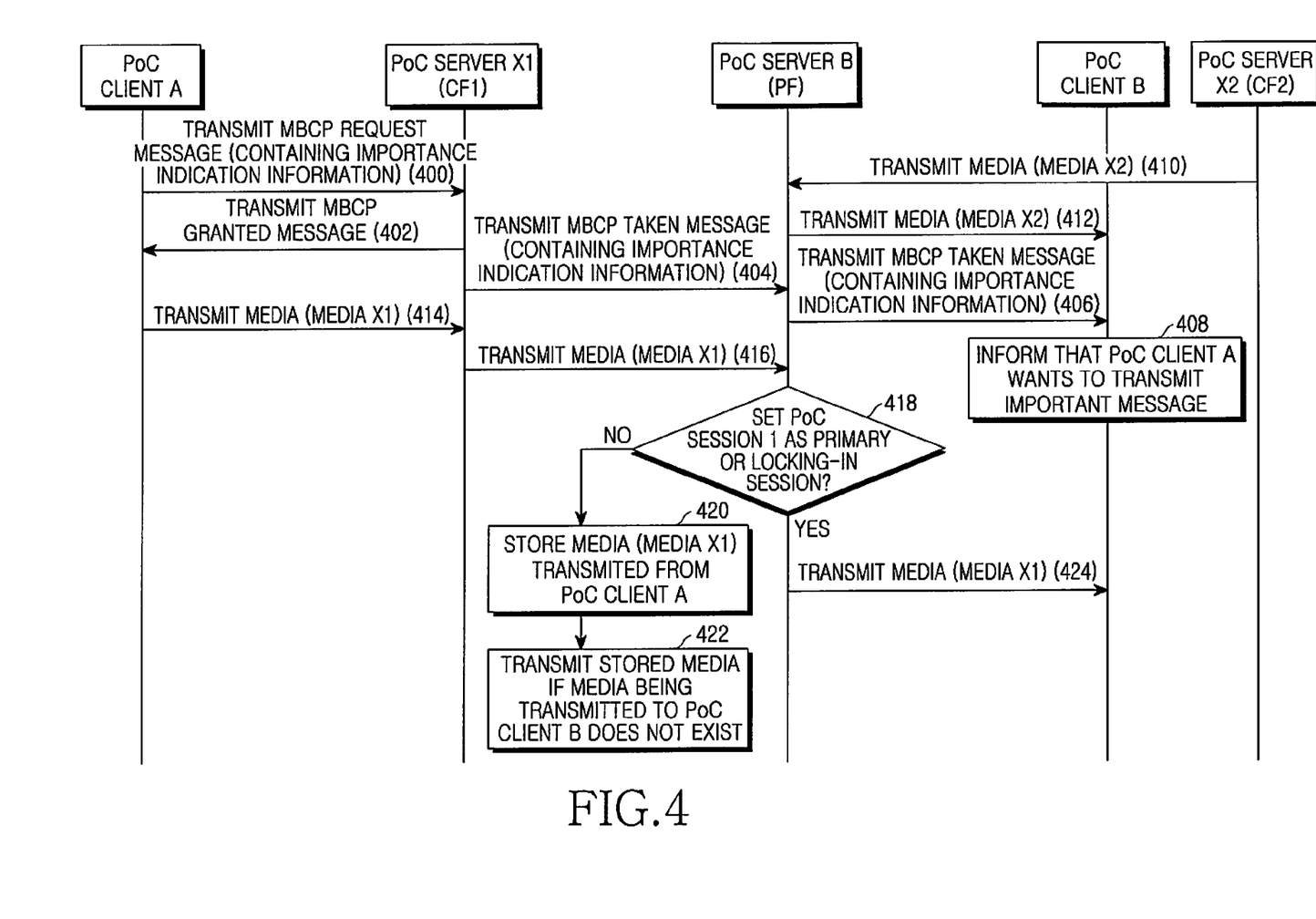
FIG. 4 is a signaling diagram of a media transmission and reception process according to the importance of a media burst in simultaneous PoC sessions according to an exemplary embodiment of the present invention.

FIG. 4 is a signaling diagram of a media transmission and reception process according to the importance of a media burst in simultaneous PoC sessions according to an exemplary embodiment of the present invention. In the current embodiment, it is assumed that a PoC client A tries to transmit an important message to a PoC client B currently participating in two PoC sessions. The PoC sessions are controlled by controlling PoC servers X1 and X2 (CF1 and CF2). That is, the controlling PoC server X1 (CF1) controls the PoC session 1, and the controlling PoC server X2 (CF2) controls the PoC session 2.

A PoC client participating in the PoC session 2 transmits media, and the PoC server X2 (CF2) transfers the media to the PoC client B via a participating PoC server B (PF) in steps 410 and 412.

If a request for media transmission is input by a PoC user, and if a request for informing that media to be transmitted by the PoC user is an important message is input, the PoC client A creates an MBCP Request message having the format illustrated in FIG. 5A in order to request the media transmission right. That is, the MBCP Request message contains importance indication information, wherein the importance indication information denotes a unique number for indicating the importance, which is contained in the option field, and a normalized message contained in the option value field, e.g. 'important message', 'urgent message', or a phrase directly edited by the PoC user. That is, the PoC client A creates an MBCP Request message containing the importance indication information according to the request of the PoC user for informing that media to be transmitted is an important message. The PoC client A transmits the MBCP Request message to the controlling PoC server X1 (CF1) in step 400.

The controlling PoC server X1 (CF1), which has received the MBCP Request message containing the importance indication information, determines whether the media transmission right is granted to the PoC client A. The determination depends on whether other media is being transmitted or whether a queue is supported. Since the determining of the media transmission right is not directly associated with the present invention, a description thereof is omitted.

If the controlling PoC server X1 (CF1) determines that the media transmission right is granted to the PoC client A, or when media is stored in a queue and the media transmission right is granted in the future, the controlling PoC server X1 (CF1) creates and transmits an MBCP Granted message to the PoC client A in step 402. Simultaneously, the controlling PoC server X1 (CF1) creates an MBCP Taken message for transmitting information, on which PoC client transmits media, to all PoC users participating in the PoC session 1. That is, since the controlling PoC server X1 (CF1) has determined from the unique number contained in the MBCP Request message that the MBCP Request message contains the importance indication information, the controlling PoC server X1 (CF1) creates the MBCP Taken message by inserting importance indication information in the option field of the MBCP Taken message. The MBCP Taken message may be created according to the format illustrated in FIG. 5B. The controlling PoC server X1 (CF1) transmits the MBCP Taken message to the PoC client B via the participating PoC server B (PF) in steps 404 and 406.

The PoC client B, which has received the MBCP Taken message containing the importance indication information, determines from the unique number contained in the option field of the MBCP Taken message that the MBCP Taken message contains the importance indication information of the PoC client A. The PoC client B informs a PoC user B in step 408 that the PoC client A wants to transmit an important message. That is, by displaying the contents contained in the option value field of the MBCP Taken message on a screen, the PoC client B can inform the PoC user B that the PoC client A wants to transmit an important message. The PoC user B, who has confirmed the contents displayed on the screen, can set the PoC session 1 as a primary or locking-in session.

Meanwhile, if the participating PoC server B (PF) receives media transmitted from the PoC client A via the controlling PoC server X1 (CF1) in steps 414 and 416, the participating PoC server B (PF) determines in step 418 whether the PoC session 1 is set as the primary or locking-in session. If it is determined in step 418 that the PoC session 1 is set as the primary or locking-in session, the participating PoC server B (PF) transmits the media transmitted from the PoC client A, i.e. the PoC session 1, to the PoC client B in step 424.

If it is determined in step 418 that the PoC session 1 is not set as the primary or locking-in session by the PoC client B, since media is being transmitted from the controlling PoC server X2 (CF2), the media transmitted from the controlling PoC server X1 (CF1) cannot be simultaneously transmitted. Thus, the participating PoC server B (PF) temporarily stores the media transmitted from the PoC client A in a local memory according to the importance indication information of the MBCP Taken message in step 420. After the media transmission of the controlling PoC server X2 (CF2) is completed, the participating PoC server B (PF) transmits the media stored in the local memory to the PoC client B in step 422. Alternatively, the media is stored in a PoC box instead of the local memory, and a message that the media is stored in the PoC box is transmitted from the PoC box to the PoC client B. In this case, when the PoC client B has spare time, the PoC client B may request the contents stored in the PoC box and receive the stored contents from the PoC box.

As described above, according to an embodiment of the present invention, when a sending PoC user determines that media to be transmitted is important, in order to inform a receiving PoC user that the media to be transmitted is important, the sending PoC user transmits an MBCP Request message containing importance indication information to a PoC server, and the PoC server, which has received the MBCP Request message, transmits an MBCP Taken message containing importance indication information to the receiving PoC user. If media corresponding to an important message is filtered since media of a primary or locking-in session among a plurality of sessions or other media is being transmitted, the PoC server temporarily stores the media in a local memory or a PoC box and transmits the stored media after the preceding media is completely transmitted.

As described above, according to the present invention, by a PoC user transmitting an MBCP Request message indicating the importance of media to be transmitted and a PoC server processing the MBCP Request message and transmitting an MBCP Taken message to a target PoC user having simultaneous PoC sessions, the target PoC user can determine based on the MBCP Taken message whether to receive the media. In addition, while one of media simultaneously transmitted from a plurality of sessions of a PoC user having simultaneous PoC sessions must be filtered according to the prior art, a method suggested in an embodiment of the present invention has an advantage in that all important media can be received without filtering even if there is a time difference. Thus, a case where important media cannot be received can be substantially prevented. From the point of view of a media sending PoC user, the reliability of media transmission increases.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A server method of transmitting and receiving media according to the importance of a media burst in a server in a messaging system, which includes a sending client trying to transmit media to a receiving client participating in simultaneous sessions, the method comprising:
   receiving, from the sending client via a first session established between the sending client and the receiving client, a Media Burst Control Protocol (MBCP) Request message for requesting a transmission of the media to the receiving client participating in the simultaneous sessions, the MBCP Request message containing importance indication information for the media to be transmitted;
   identifying the importance indication information contained in the MBCP Request message for determining that an important message will be transmitted;
   generating an MBCP Taken message containing the importance indication information;
   transmitting the MBCP Taken message to a plurality of receiving clients participating in the first session,
   wherein the plurality of clients includes the receiving client,
   if the media is received from the sending client, determining whether a session by which the media is transmitted is set as a session for first transmission for the receiving client; and
   if it is determined that the session by which the media transmitted from the sending client is transmitted is set as the session for first transmission, transmitting the media transmitted from the sending client to the receiving client first of all;
   if the session by which the media transmitted from the sending client is transmitted is not set as the session for first transmission for the receiving client, and if media being currently transmitted to the receiving client exists, storing the media transmitted from the sending client in a local memory; and
   if media being currently transmitted to the receiving client does not exist, transmitting the media stored in the local memory to the receiving client.

2. The server method of claim 1, wherein the session for first transmission is a primary or locking-in session.

3. The server method of claim 1, wherein the importance indication information comprises at least one of an option IDentifier (ID) field containing a unique number for activating an importance indication function and an option value field containing a phrase indicating an important message.

4. The server method of claim 3, wherein the option value field contains text indicating an important message or a phrase directly edited by a user.

5. The server method of claim 1, wherein the server is a Push-To-Talk (PTT) over Cellular (PoC) server.

6. A server method of transmitting and receiving media according to the importance of a media burst in a server in a messaging system, which includes a sending client trying to transmit media to a receiving client participating in simultaneous sessions, the method comprising:
   receiving, from the sending client via a first session established between the sending client and the receiving client, a Media Burst Control Protocol (MBCP) Request message for requesting a transmission of the media to the receiving client participating in the simultaneous sessions, the MBCP Request message containing importance indication information for the media to be transmitted;
   identifying the importance indication information contained in the MBCP Request message for determining that an important message will be transmitted;
   generating an MBCP Taken message containing the importance indication information;
   transmitting the MBCP Taken message to a plurality of receiving clients participating in the first session,
   wherein the plurality of clients includes the receiving client
   if the media is received from the sending client, determining whether a session by which the media is transmitted is set as a session for first transmission for the receiving client; and if it is determined that the session by which the media transmitted from the sending client is transmitted is set as the session for first transmission, transmitting the media transmitted from the sending client to the receiving client first of all;

if the session by which the media transmitted from the sending client is transmitted is not set as the session for first transmission, and if media being currently transmitted to the receiving client exists, storing the media transmitted from the sending client in a box;

transmitting a message for informing that the media transmitted from the sending client is stored in the box to the receiving client; and if a message for requesting the media stored in the box to be transmitted is received from the receiving client, transmitting the media stored in the box to the receiving client.

7. The server method of claim 6, wherein the server is a Push-To-Talk (PTT) over Cellular (PoC) server.

8. The server method of claim 6, wherein the session for first transmission is a primary or locking-in session.

9. The server method of claim 8, wherein the importance indication information comprises at least one of an option IDentifier (ID) field containing a unique number for activating an importance indication function and an option value field containing a phrase indicating an important message.

10. The server method of claim 9, wherein the option value field contains text indicating an important message or a phrase directly edited by a user.

11. A server for transmitting and receiving media according to the importance of a media burst, the server comprising:
a controlling server for receiving, from a sending client via a first session established between the sending client and a receiving client, a Media Burst Control Protocol (MBCP) Request message for requesting transmission of the media to a receiving client participating in simultaneous sessions including the first session, the MBCP Request message containing importance indication information for media to be transmitted, identifying the importance indication information contained in the MBCP Request message for determining that an important message will be transmitted, and generating an MBCP Taken message containing the importance indication information; and
a participating server for transmitting the MBCP Taken message to a plurality of clients participating in the first session,
wherein the plurality of clients include the receiving client;
wherein the participating server determines whether a session by which the media is transmitted is set as a session for first transmission for the receiving client if media transmitted from the sending client is received, and if it is determined that the session by which the media transmitted from the sending client is transmitted is set as the session for first transmission, transmits the media transmitted from the sending client to the receiving client first of all, and
wherein if the session by which the media transmitted from the sending client is transmitted is not set as the session for first transmission, and if media being currently transmitted to the receiving client exists, the participating server stores the media transmitted from the sending client in a local memory, and if media being currently transmitted to the receiving client does not exist, the participating server transmits the media stored in the local memory to the receiving client.

12. The server of claim 11, wherein the session for first transmission is a primary or locking-in session.

13. The server of claim 11, wherein the importance indication information comprises at least one of an option IDentifier (ID) field containing a unique number for activating an importance indication function and an option value field containing a phrase indicating an important message.

14. The server of claim 13, wherein the option value field contains text indicating an important message or a phrase directly edited by a user.

15. A server for transmitting and receiving media according to the importance of a media burst, the server comprising:
a controlling server for receiving, from a sending client via a first session established between the sending client and a receiving client, a Media Burst Control Protocol (MBCP) Request message for requesting transmission of the media to a receiving client participating in simultaneous sessions including the first session, the MBCP Request message containing importance indication information for media to be transmitted, identifying the importance indication information contained in the MBCP Request message for determining that an important message will be transmitted, and generating an MBCP Taken message containing the importance indication information: and
a participating server for transmitting the MBCP Taken message to a plurality of clients participating in the first session,
wherein the plurality of clients include the receiving client;
wherein the participating server determines whether a session by which the media is transmitted is set as a session for first transmission for the receiving client if media transmitted from the sending client is received, and if it is determined that the session by which the media transmitted from the sending client is transmitted is set as the session for first transmission, transmits the media transmitted from the sending client to the receiving client first of all, and
wherein if the session by which the media transmitted from the sending client is transmitted is not set as the session for first transmission, and if media being currently transmitted to the receiving client exists, the participating server stores the media transmitted from the sending client in a box, transmits a message for informing that the media transmitted from the sending client is stored in the box to the receiving client, and if a message for requesting the media stored in the box to be transmitted is received from the receiving client, the participating server transmits the media stored in the box to the receiving client.

16. The server of claim 15, wherein the session for first transmission is a primary or locking-in session.

17. The server of claim 15, wherein the importance indication information comprises at least one of an option IDentifier (ID) field containing a unique number for activating an importance indication function and an option value field containing a phrase indicating an important message.

18. The server of claim 17, wherein the option value field contains text indicating an important message or a phrase directly edited by a user.

* * * * *